Dec. 5, 1967  J. LYONS  3,355,835

JIG FISHING APPARATUS

Filed April 23, 1965  3 Sheets-Sheet 1

INVENTOR.
JIM LYONS
BY
Knox & Knox

Dec. 5, 1967  J. LYONS  3,355,835
JIG FISHING APPARATUS
Filed April 23, 1965  3 Sheets-Sheet 2

INVENTOR.
JIM LYONS
BY
Knox & Knox

Dec. 5, 1967   J. LYONS   3,355,835
JIG FISHING APPARATUS
Filed April 23, 1965   3 Sheets-Sheet 3

INVENTOR.
JIM LYONS
BY
Knox & Knox

United States Patent Office 3,355,835
Patented Dec. 5, 1967

3,355,835
JIG FISHING APPARATUS
Jim Lyons, 5104 N. Harbor Drive,
San Diego, Calif. 92106
Filed Apr. 23, 1965, Ser. No. 450,395
5 Claims. (Cl. 43—6.5)

ABSTRACT OF THE DISCLOSURE

This jig fishing line handling unit is for mounting on a fishing boat and employs a plurality of reels which are driven from a common source and shiftable individually into reeling, stop and free running positions. The drive means includes a resilient torsional shock absorbing coupling so that jerk loads are absorbed and the shaft is fluid damped to prevent backlash.

The present invention relates to fishing equipment and more specifically to jig fishing apparatus.

In surface jig fishing for large fish, such as albacore, the usual technique is to trail lures on jig lines behind a boat, the lines being spaced on opposite sides of the boat from outrigger type jig poles. The lines are let out and hauled in by hand and are usually of nylon, to facilitate handling, which is susceptible to breakage under jerk loads. Large fish are difficult to handle under such circumstances and the problem is further complicated by the accumulation of loose line, which is usually dropped on the deck as it is hauled in.

The primary object of this invention, therefore, is to provide jig fishing apparatus in which the lines are stored neatly on reels which are power driven for hauling in large fish and which can be locked against rotation at any extension of line or made freely rotating for paying out of line. Since direct handling of the lines is reduced to an absolute minimum, it is practical to use high strength wire lines.

Another object of this invention is to provide jig fishing apparatus wherein multiple, individually controllable reels are operated by a common power source, with provision for absorbing sudden loads and for preventing backlash which might cause tangling of lines.

Another object of this invention is to provide jig fishing apparatus which is adaptable to present boat equipment and jig fishing techniques, and does not require extensive changes in installation or use.

The apparatus and its use are illustrated in the drawings, in which.

Similar characters of reference indicate similar or identical elements and portions throughout the specification and throughout the views of the drawing.

Figure 1:
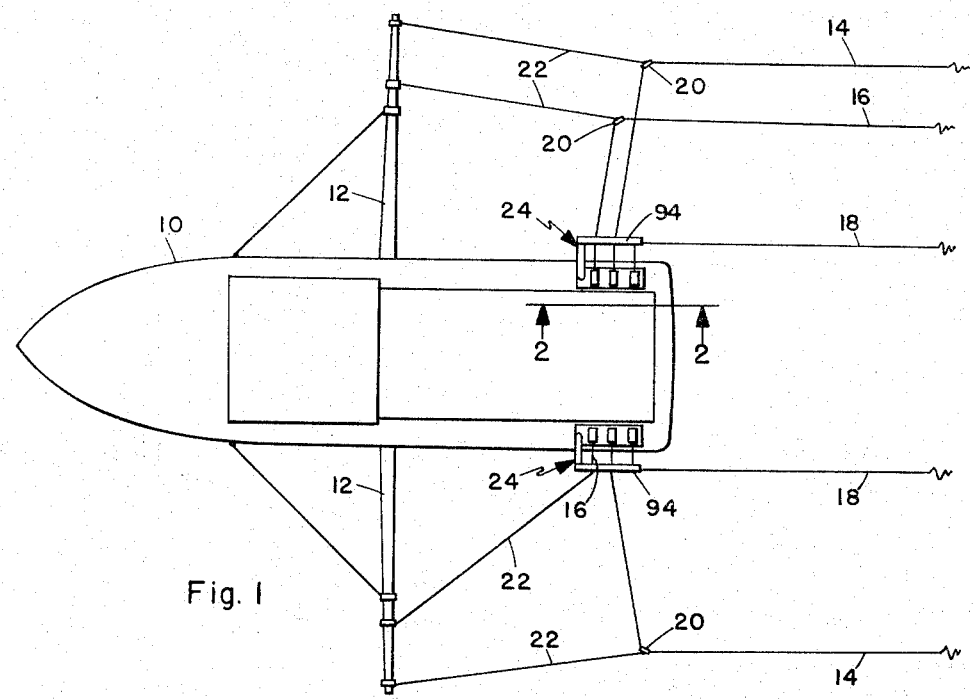
FIGURE 1 is a diagrammatic top plan view of a typical boat and jig line arrangement.

As illustrated in FIGURE 1, the typical jig fishing technique utilizes a boat 10 fitted with laterally extending outriggers or jig poles 12, from which jig lines can be trailed at spaced intervals on each side of the boat. The outboard line is usually referred to as the long jig line 14, the next inboard line as the middle jig line 16 and the inboard line, often trailed from the stern of the boat itself, as the whiskey line 18. The jig lines 14 and 16 run through sleeve-like guides 20 at the end of fixed length tag lines 22, which are tethered to the jig poles 12 to extend rearwardly therefrom. The jig lines carry suitable hooks or lures, not shown, according to the fish being sought.

All of the jig lines on a side are attached to a line handling unit 24 having a reel 26 for each line, the reels being carried on a shaft 28 which is journalled in bearing posts 30 mounted on a base member 32, each reel being between a pair of bearing posts. The reels 26 are rotatable and axially slidable on shaft 28, each reel having an arcuate yoke 34 fitted around the lower portion thereof and extending for slightly more than half the circumference of the reel to retain the line on the reel. Yokes 34 have a second purpose also and each has diametrically opposed bosses 36 projecting outwardly on opposite sides, the bosses resting in the forked ends 38 of bellcranks 40 which support the yokes. The bellcranks 40 are pivotally mounted on fixed brackets 42 and have shift arms 44 interconnected by a tie bar 46 to move in unison. When coupled bellcranks 40 are swung about their pivots 48, the yoke 34 supported thereon is shifted laterally, causing the engaged reel 26 to slide on shaft 28.

Figure 3:
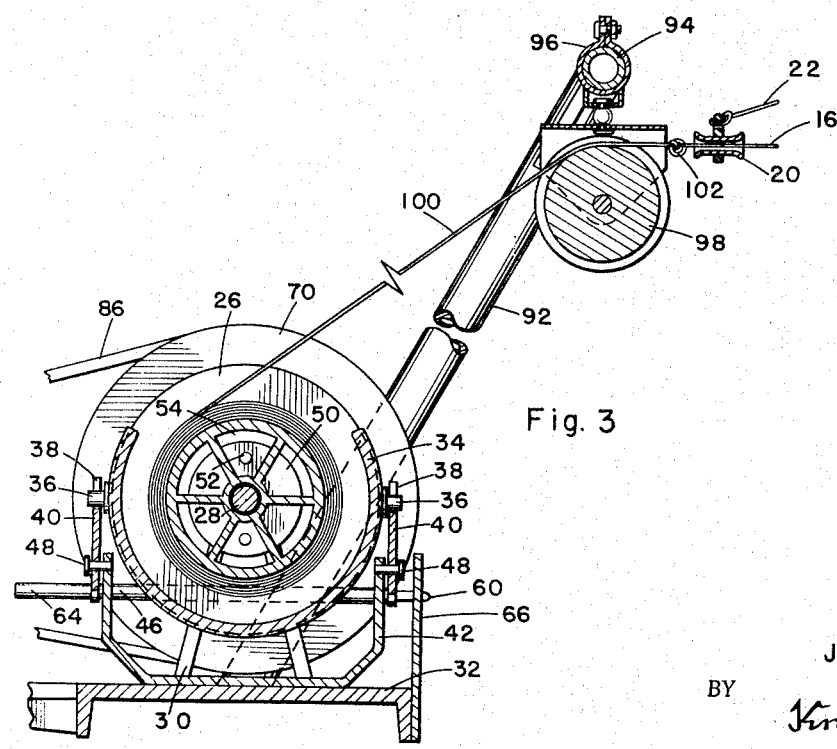
FIGURE 3 is a sectional view taken on line 3—3 of FIGURE 2.
Figure 2:
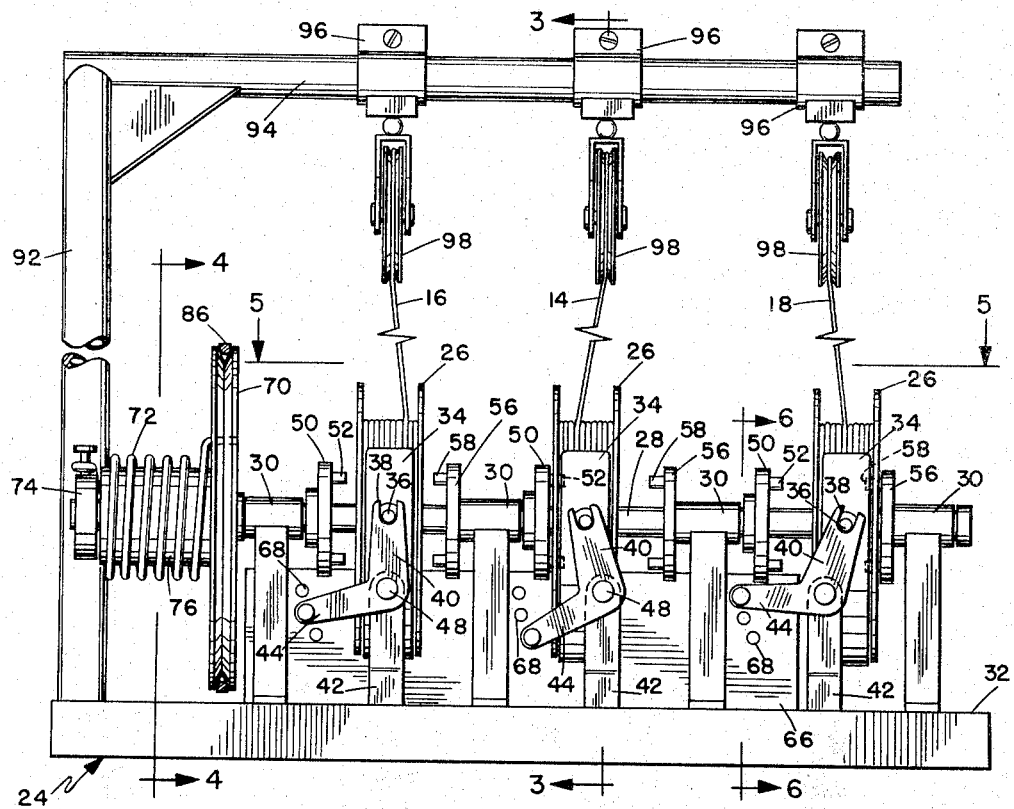
FIGURE 2 is an enlarged side elevation of a line handling unit, as viewed in the direction of arrows 2—2 in FIGURE 1.
Figure 4:
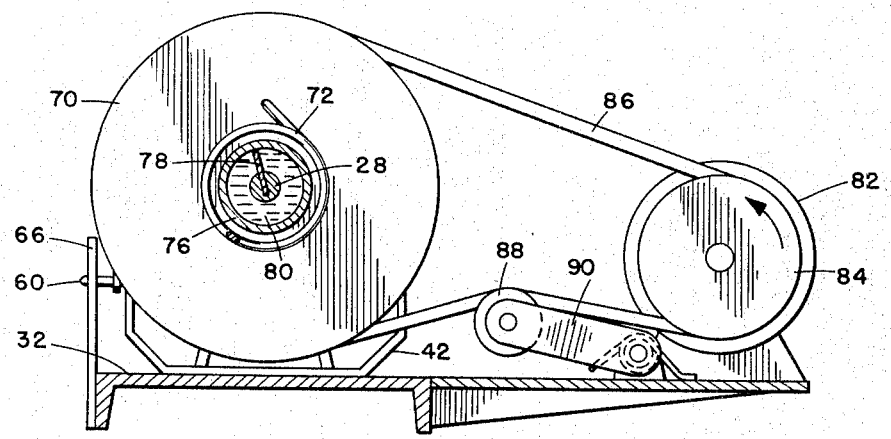
FIGURE 4 is a sectional view taken on line 4—4 of FIGURE 2.
Figure 5:
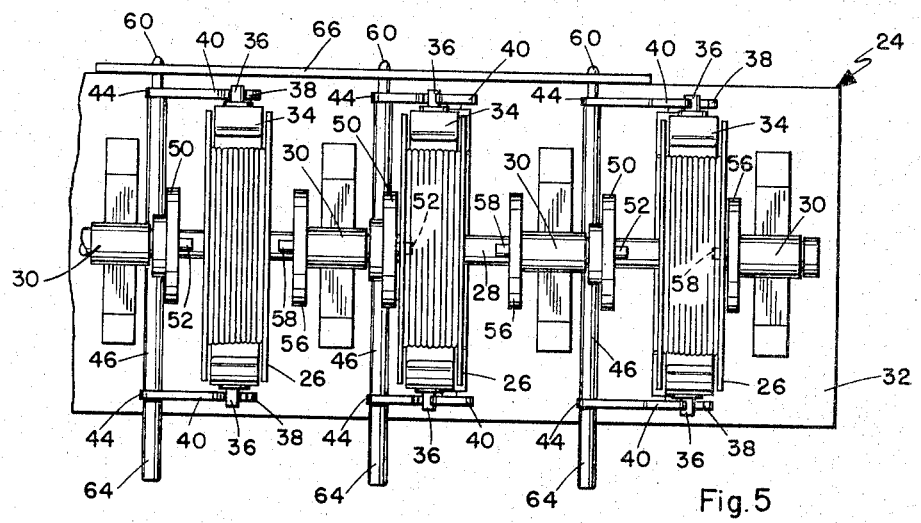
FIGURE 5 is a partial top plan view taken in the direction of arrows 5—5 in FIGURE 2.
Figure 6:
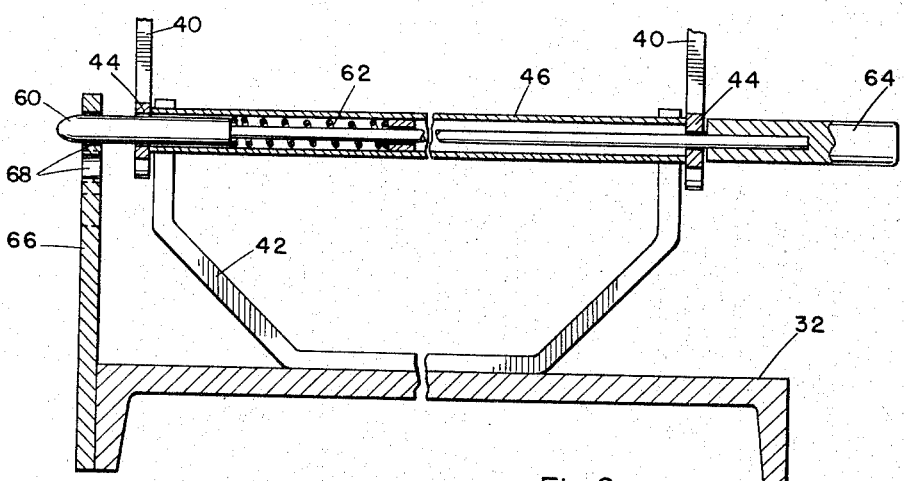
FIGURE 6 is an enlarged sectional view taken on line 6—6 of FIGURE 2.

On the shaft 28 at one side of each reel 26 is a drive disc 50 fixed to shaft 28, the drive disc having axially projecting drive pins 52 which can engage in openings 54 in the reel, the openings being defined between spokes as illustrated in FIGURE 3, or by suitable perforations in the central portion of the reel. At the other side of each reel 26 is a brake disc 56 fixed to the adjacent bearing post 30 and having projecting stop pins 58 which can also engage in the reel openings 54. Thus the reels can each be shifted to one side to engage the drive disc and rotate with the shaft, or to the other side to engage the brake disc and be held stationary. In between these two positions the reels are free to rotate relative to the shaft.

Various means may be used to index the reels in their required positions, that illustrated comprising an indexing pin 60 axially slidable in each tie bar 46 and biased by a spring 62 to extend from one end, the other end of the pin having a handle 64. Fixed to base member 32 is an indexing plate 66 having sets of sockets 68 spaced to receive the indexing pins 60 selectively when the reels are moved to their required positions.

At one end of shaft 28 is a driven pulley 70 free to rotate on the shaft and coupled thereto by a torsion spring 72 fitted around the shaft and terminally secured to the pulley and to a clamp collar 74 fixed on the shaft. Fixed to the pulley 70 and within the spring 72 is a drum 76 concentric with shaft 28, the shaft having a radial vane 78 fixed thereto which is immersed in a suitable fluid 80 filling said drum. By this means the pulley is resiliently connected to the shaft to absorb jerk loads and is fluid damped to prevent backlash of the spring. Any suitable motor 82 can be used to rotate pulley 70 through a drive pulley 84 and belt 86. To provide for controlled slippage of the belt 86 and prevent overload breakage of the lines, a tension pulley 88 is held against the pulling run of the belt by a spring loaded arm 90. This will allow pulley 70 to slip under predetermined excess load, as by snagging of a line, until the line causing the strain can be released by shifting the reel out of the drive position. Other means may be equally suitable for controlling belt tension and slippage.

Extending upwardly and outwardly from base member 32 is a rigid davit pole 92 having at its upper end a hanger bar 94 substantially parallel to said base member. Mounted on the hanger bar 94 are brackets 96 from which pulleys 98 are pivotally suspended, the brackets being adjustable along the hanger bar so that each pulley can be positioned substantially in alignment with one reel 26. Each jig line extends from its reel and over the respective pulley 98, the innermost length of each line wound initially on the reel comprising an inhaul line 100. To limit the extension of each jig line a stop ring 102, or similar stop means, is secured to the line, the stop being small enough to pass over pulley 98 and to be wound on the reel with the line, but being too large to pass through the guide 20, as indicaed in FIGURE 3.

The lines are extended for fishing by moving the reels 26 to the intermediate positions for free rotation, the water drag on the lures and lines causing each line to pay out until limited by its stop ring 102. If full line extension is not required, any reel 26 can be locked in place by shifting into engagement with the respective brake disc 56. Motor 82 drives the shaft 28 in one direction only and can operate continuously or be controlled by a suitable switch. When a catch is made the affected line can be hauled in by shifting the appropriate reel into engagement with the drive disc 50, which is turning with shaft 28. If the fish jerks the line during the hauling in, the shock will be absorbed by the spring 72, the fluid immersed vane 78 damping out backlash and preventing looping or tangling of the incoming line. By means of handle 64, the reel in operation can be released or braked at any time if necessary in the handling of the fish. If the line is completely reeled in the lure, and the fish, will be brought up to the hanger bar 94 immediately alongside the boat, which greatly simplifies handling.

The line handling unit as illustrated will accomodate three lines, but could be constructed to hold any reasonable number of reels and lines, operable individually, in groups, or all together from a single power source. Long lines can be handled and all lines are neatly stowed, keeping the boat clear of tangled lines and making the fishing operation safer and more efficient.

It is understood that minor variation from the form of the invention disclosed herein may be made without departure from the spirit and scope of the invention, and that the specification and drawings are to be considered as merely illustrative rather than limiting.

I claim:
1. A jig fishing line handling unit for mounting on a boat, comprising:
   a base member;
   at least one line holding reel rotatably and shiftably mounted on said base member;
   a motor operatively connected to drive means engageable with said reel;
   stop means engageable with said reel;
   shift means coupled to said reel to shift the reel selectively into engagement with said drive means and said stop means and to a position wherein the reel is freely rotatable;
   and guide means on said unit spaced from said reel to guide a line extending therefrom.

2. Jig fishing apparatus according to claim 1, wherein said drive means includes a resilient torsional shock absorbing coupling and torsional damping means connected to said coupling.

3. A jig fishing line handling unit for mounting on a boat, comprising:
   a base member;
   a driven shaft mounted on said base member;
   a plurality of line holding reels rotatably mounted on said shaft;
   a flexible line wound on each of said reels;
   drive means secured on and rotatable with said shaft adjacent each of said reels;
   brake means adjacent each of said reels;
   shift means coupled to each reel to shift the reel selectively into engagement with said drive means and brake means;
   and line guiding means for each of said lines;
   said reels are being axially slidable on said shaft and said shift means includes a yoke partially encircling each of said reels, arm members pivotally mounted on said unit and supporting each of said yokes, and indexing means connected to said arm members to hold the same at selected positions.

4. A jig fishing line handling unit for mounting on a boat, comprising:
   a base member;
   a driven shaft mounted on said base member;
   a plurality of line holding reels rotatably mounted on said shaft;
   a flexible line wound on each of said reels;
   drive means secured on and rotatable with said shaft adjacent each of said reels;
   brake means adjacent each of said reels;
   shift means coupled to each reel to shift the reel selectively into engagement with said drive means and brake means;
   line guiding means for each of said lines; and
   a motor having a resilient shock absorbing coupling to said shaft.

5. Apparatus according to claim 1 wherein said drive means includes a shock absorbing coupling comprising a pulley concentric with said shaft and connected thereto by a torsion spring, a fluid filled drum concentric with said shaft, a vane on said shaft and within said drum, thereby providing for resilient drive connection of the pulley and damping to prevent backlash of said spring.

References Cited
UNITED STATES PATENTS

| | | | |
|---|---|---|---|
| 1,360,429 | 11/1920 | Michaelis | 43—15 X |
| 2,391,939 | 1/1946 | Bannister | 254—185 |
| 3,049,829 | 8/1962 | Clapp | 43—6.5 |

SAMUEL KOREN, *Primary Examiner.*

WARNER H. CAMP, *Examiner.*